(12) United States Patent
Khorsand et al.

(10) Patent No.: US 12,253,937 B1
(45) Date of Patent: Mar. 18, 2025

(54) SOFTWARE TOOL QUALIFICATION FOR SAFETY-CRITICAL SYSTEMS

(71) Applicant: Zoox, Inc., Foster City, CA (US)

(72) Inventors: Parisa Khorsand, Mountain View, CA (US); Kaushik Raghu, San Bruno, CA (US); Selvamraju Somalraju, Mountain View, CA (US); Yang Song, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 142 days.

(21) Appl. No.: 17/540,053

(22) Filed: Dec. 1, 2021

(51) Int. Cl.
*G06F 11/36* (2006.01)
*G06F 8/71* (2018.01)
*G06F 11/07* (2006.01)
*G06F 11/3668* (2025.01)

(52) U.S. Cl.
CPC ............ *G06F 11/3688* (2013.01); *G06F 8/71* (2013.01); *G06F 11/0772* (2013.01); *G06F 11/3692* (2013.01); *G06F 11/3696* (2013.01)

(58) Field of Classification Search
CPC .... G06F 8/41; G06F 11/0772; G06F 11/3688; G06F 11/3692; G06F 11/3696
See application file for complete search history.

(56) References Cited

U.S. PATENT DOCUMENTS

| 7,797,151 | B2* | 9/2010 | Apte | G06F 9/454 717/136 |
| 8,365,138 | B2* | 1/2013 | Iborra | G06F 16/2365 717/113 |
| 8,930,502 | B2* | 1/2015 | Alvarez Rodriguez | H04L 67/125 709/219 |
| 9,465,591 | B2* | 10/2016 | Beale | G06F 8/37 |
| 9,483,261 | B2* | 11/2016 | Frenkiel | G06F 8/30 |
| 10,394,552 | B2* | 8/2019 | Elkabany | G06F 8/71 |
| 10,908,881 | B2* | 2/2021 | Burks | G06F 8/355 |
| 2005/0081189 | A1* | 4/2005 | Krasikov | G06F 8/73 717/123 |
| 2006/0168570 | A1* | 7/2006 | Wang | G06F 11/3624 717/127 |
| 2007/0100519 | A1* | 5/2007 | Engel | G07C 5/008 701/31.4 |
| 2007/0169027 | A1* | 7/2007 | Drepper | G06F 8/71 717/174 |
| 2007/0220497 | A1* | 9/2007 | Chudukatil | G06F 8/10 717/140 |

(Continued)

*Primary Examiner* — Douglas M Slachta
(74) *Attorney, Agent, or Firm* — EIP US LLP

(57) ABSTRACT

There is provided a system comprising a memory, one or more processors, and one or more non-transitory computer-readable media storing instructions executable by the one or more processors. The instructions cause the processors to implement a first and a second software tool. The first software tool is configured to receive a first file in a first format, wherein the first file comprises data entered by a user that includes a value for an operational parameter of a component, generate, based at least in part on the data in the first file, a second file comprising source code in a second format that is different to the first format, and store the second file. The second software tool is configured to determine an error associated with one or more of the first file or the second file and cause the processors to perform an action based on determining the error.

18 Claims, 5 Drawing Sheets

(56) References Cited

U.S. PATENT DOCUMENTS

| | | | | |
|---|---|---|---|---|
| 2008/0155513 | A1* | 6/2008 | Ling | G06F 11/3696 |
| | | | | 717/135 |
| 2009/0327994 | A1* | 12/2009 | Christensen | G06F 8/73 |
| | | | | 717/106 |
| 2011/0078211 | A1* | 3/2011 | Gass | G06F 8/65 |
| | | | | 707/E17.044 |
| 2012/0041638 | A1* | 2/2012 | Johnson | G06F 11/3003 |
| | | | | 701/33.1 |
| 2015/0058830 | A1* | 2/2015 | Verlaguet | G06F 9/3846 |
| | | | | 717/136 |
| 2017/0353302 | A1* | 12/2017 | Fernandez | H04L 9/14 |
| 2018/0039558 | A1* | 2/2018 | Shiraishi | G06F 11/3608 |
| 2020/0034126 | A1* | 1/2020 | Lian | G06F 8/427 |
| 2020/0125354 | A1* | 4/2020 | Kim | G06F 11/0793 |
| 2021/0176209 | A1* | 6/2021 | Hu | H04L 69/18 |
| 2021/0349808 | A1* | 11/2021 | Chen | G06F 9/541 |
| 2022/0318008 | A1* | 10/2022 | Pandurangarao | G06Q 10/06395 |

* cited by examiner

SOFTWARE TOOL QUALIFICATION FOR SAFETY-CRITICAL SYSTEMS

BACKGROUND

An electronic device or system may comprise one or more processors that are configured to run software in order to perform one or more operations. The software may be stored in memory. The software may be built based on source code that is collected and compiled to make it executable by the one or more processors. Said devices or systems may be configured to run autonomously, i.e. without human intervention, based upon the software stored in memory. An example of such an autonomous device or system is an autonomous vehicle that is configured to transport users without being controlled by a human driver or pilot. Due to complexity of such systems, it may be difficult to validate software for safety and other purposes.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
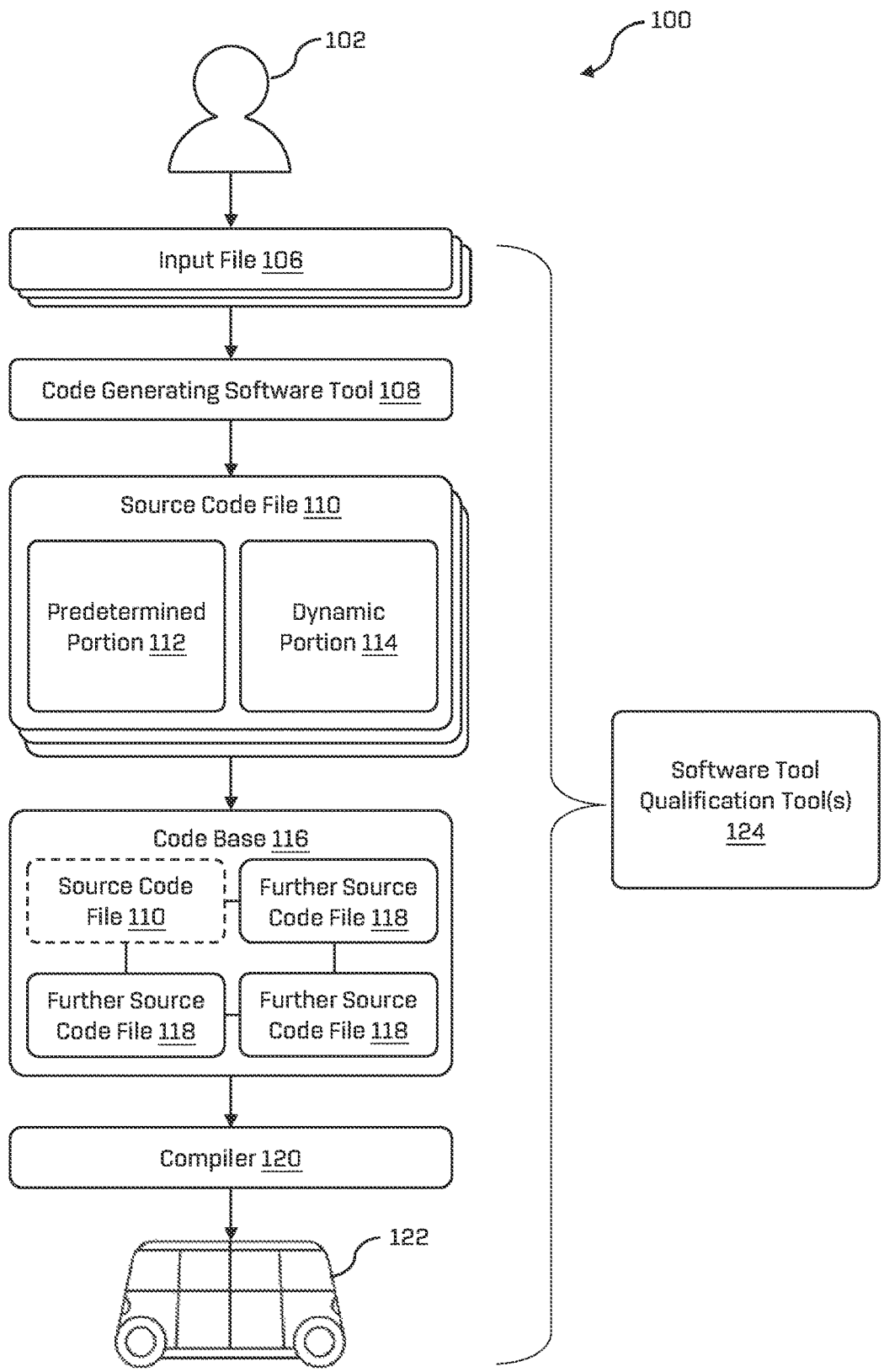
FIG. 1 is a pictorial diagram of a system for software generation and qualification according to embodiments of the present invention.

This application relates to methods and systems for qualification, validation, and/or verification (which may be referred to solely as qualification herein) of a software tool that is used to automatically generate source code for inclusion in software that may form part of a safety-critical application. The source code may be compiled to generate machine-readable instructions for implementation by a processor of a device or system. Qualifying a software tool may be achieved by applying tests and checks at different stages of the process of automatically generating source code with the software tool. These tests and checks may identify errors in a file before it is used to generate the source code, errors in the source code itself immediately after it is generated, errors that are only identifiable when the software is run, code coverage, successful test conditions, and the like. By checking at multiple different positions within the process, errors can be caught early to ensure that the source code will not cause malfunction of the safety-critical application when run on a safety-critical system.

A code base is a collection of source code that is used to build software executable by a processor. A code base may comprise a plurality of files containing source code that, when the code is executed, interact with one another in order for the processors or other components to operate correctly. For example, in a system comprising a plurality of different components, there may be files in the plurality of files that relate to the operation of each component, as well as files relating to the interface between different components. Some or all of the source code of the code base may be stored in a code base repository before compilation. Some of the source code of the code base may be stored elsewhere, such as in server caches or other local storage.

Source code is code written in a human-readable programming language. Source code of a code base is typically written in the same programming language to facilitate interaction between the source code and for ease of compilation. Conventionally, source code of a code base is written entirely by human programmers. Once the code base is complete, the software may be compiled by a compiler, which converts the source code from the human-readable programming language into a machine-readable programming language for execution by one or more processors of the system on which the software is to be run.

Writing source code is a time-consuming exercise, especially for complex systems, in which many different components are interacting (sometimes in a highly complex manner) and for which the software is intricate and/or data-intensive. The amount of time taken to write and debug source code, as well as the number of programmers required to perform these actions, makes the generation of source code and code bases more generally an expensive operation, especially in highly complex and safety-critical systems, such as autonomous vehicles. Furthermore, where multiple programmers are required to create source code of a code base, it is likely that each programmer may write source code in a slightly different way and may introduce errors into their source code that differ depending upon which programmer wrote the source code.

Accordingly, a software tool may be used to automatically generate some of the source code for a code base, particularly source code that is often repeated or that has repeated parts. For a system having a plurality of different components that are required to interface with one another, the source code for the interfacing may be substantially similar for each combination of components. For example, for each component, which may be a software component or a hardware component, data for certain operational parameters may be specified that enable the interaction of the component with other components, such as how much memory is to be dedicated to the component, the size of the component, an interface protocol used by the component, a message protocol used by the component, etc. The automatic generation of the source code may therefore be achieved using a software tool that receives data from a user relating to the component(s) and to these operational parameters and generates source code based on the received data.

This approach avoids some of the difficulty in generating large amounts of source code by automating the process. The use of a software tool also standardizes the source code, by ensuring that the source code is written in a similar way for each component. Random errors introduced by individual users are also removed.

Where software generated at least in part using a software tool as described above is used for a device or system, it is important to ensure that errors are not introduced into the software by the use of the software tool that may cause malfunctions of the system or device on which the software will eventually operate.

Some systems may be considered to be 'safety-critical' systems, in which a malfunction may endanger a human being, the environment around the system, or the system itself. Different levels of safety-critical systems exist, depending upon the level of harm that a malfunction may cause. For example, autonomous road vehicles and aircraft may both be considered to be safety-critical systems, but the risk of harm is greater if an aircraft malfunctions and so is a higher-level safety-critical system. It is particularly important to ensure that software operating on safety-critical systems is free of errors that may cause malfunction. In addition to ensuring that errors are not introduced, it is also important to ensure that a software tool does not prevent the detection of errors that may eventually be included in safety-critical systems. For example, where the safety-critical system is a road vehicle, it is important to ensure that errors are not introduced so that the vehicle complies with the relevant safety standards, such as ISO 26262.

It is undesirable to require input to a software tool and source code generated by a software tool to be manually checked for errors by a programmer, as this defeats the point of using the software tool in the first place. In some situations, it may not be possible to manually check source code generated by a software tool, due to, for example, the software tool being run in response to a build call that automatically compiles the software after the source code is generated.

Instead, the inventors of the present invention have identified solutions for qualification of a code generating software tool to ensure that automatically generated source code that is used to compile software that will run on a safety-critical system does not include errors or inconsistencies that would cause the safety-critical system to malfunction.

These solutions involve the application of one or more software tool qualification tools that operate to identify potential errors, inconsistencies, or other potential issues in source code that may cause a malfunction when the software is compiled and run on the safety-critical system. These tools therefore provide qualification of the software tool. The software tool qualification tools operate on inputs to and outputs from the software tool as well as the compiled software to ensure that the source code is error free, complies with a certain amount of code coverage, and/or other user-specified qualifications. As the qualification tools act on input and output of the software tool, as well as the subsequent result of the use of the software tool, rather than the software tool itself, the software tool maybe considered to be qualified indirectly.

These software tool qualification tools, which may be referred to as 'qualification tools' or 'second software tools' to distinguish from the software tool being qualified, may be applied to a file containing data provided by a user, to a file generated by the software tool being qualified, or to the software once it is compiled. In other words, the data provided to and output by the software tool may be qualified by one or more qualification tools prior to providing the source code to a compiler for compilation of the software, at least, to ensure that errors are identified and are not introduced into the software. Even after the software is compiled, further qualification tools may be used to ensure that, during an initialization phase of the software, errors are not present in the software.

The software tool being qualified will be referred to hereafter as the code generating software tool, to distinguish from the one or more qualification tools. The methods and systems described herein may be applied to any software tool that aids in the creation of software for use in safety-critical systems.

The qualification tools may apply one or more tests to the files. For example, in some embodiments, the qualification tool may be configured to apply one or more tests to a first file provided as input to the code generating software tool. The first file may comprise the data from the user and may be written in a data exchange format, and so the second software tool may be configured to identify errors in the data entered by the user. The tests applied to the first file may include determining any errors with respect to ranges or values in the first file. This may take the form of a qualification tool that forms part of the code generating software tool, or may be a separate qualification tool.

The qualification tools may apply one or more tests to a second file that is output from the code generating software tool. The second file may comprise source code generated by the code generating software tool in the programming language. The qualification tools may apply one or more tests before the source code is stored as part of the code base. These tests may include applying unit tests to identify errors in what has been output from the code generating software tool. The tests may also or alternatively include comparing what is found in the source code with other code in other files in the code base, or with a 'master' list, to determine where incompatibilities or inconsistencies may occur in the second file. In other words, the second file is qualified to ensure that no errors were introduced by converting the data entered by the user to source code and that data entered by the user will be compatible with other data, such as data for other hardware, already specified in the code base.

The qualification tools may apply one or more tests to the code generating software tool. The one or more tests may comprise one or more unit tests applied to the code generating software tool. The one or more unit tests may identify an input from the input file and determine an expected output from the code generating software tool. The actual output from the code generating software tool in the source code may be compared with the expected output. If the expected output and the actual output match then the test may be considered to be passed. In this way, it may be determined that the code generating software tool is operating as expected. In some examples, the one or more unit tests may provide test inputs to the code generating software tool and the output of the code generating software tool may be compared with a predetermined expected output of the one or more unit tests to determine one or more errors in the code generating software tool. In some examples, the code generating software code may comprise a qualification tool configured to determine whether the values provided to it in the input file are valid. The unit tests may provide valid values and/or invalid values to check the operation of the code generating software tool. When providing valid values, it may be determined that the output from the code generating software tool is the expected value. When providing invalid values, it may be determined that the qualification tool that is part of the code generating software tool has correctly identified that the value is invalid and has raised an error.

The qualification tools may also apply one or more tests to the software during an initialization phase. These qualification tools may take the form of one or more runtime scripts or checkers that are coded into source code of the code base and that are arranged to verify the correct operation of the components that the first and second files concern. In other words, other pieces of source code may be provided in the code base that, when run as part of the software after compilation, interact with the part of the software derived from the source code from the second file.

The qualification tools may comprise a single tool that performs some or all of the above qualification processes. In some embodiments, a separate code generating software tool, developed separately from the code generating software tool may be used to qualify the code generating software tool. The separate code generating software tool may be configured to receive the first file and to generate a second file based on the first file, which should be the same or substantially similar to the second file produced by the code generating software tool under qualification. Differences in the files may show that there is an error in the data in the first file, the second file, or in the code generating software tool itself.

While the above tools relate to variable, dynamic data, qualification of a software tool also relies on the fixed, predetermined pieces of data or code being accurate. Therefore, data not entered by the user may be thoroughly reviewed and qualified by one or more programmers prior to being allowed to be used in the generation of source code. By assuring that non-changing, predetermined code and parts of files are error-free before they are used in the generation of source code, errors are restricted to those caused by the variable inputs to the different tools. This allows the qualification tools described herein to focus on the dynamic, changing parts of the data, which reduces the number of tests and scope of qualification required.

To expand on the above, FIG. 1 shows a pictorial diagram of a system 100 for software generation, including a code generating software tool and one or more software tool qualification tools as described above. The system shows a flow of data from a user 102 at the top of FIG. 1 to a vehicle 122, which is an example of a device onto which software, generated using the processes described herein, may be loaded.

The user 102 may initially provide data input to generate an input file 106. The data may be input by the user 102 at a terminal, such as a computer. The user 102 may provide the data in a first format. The first format may be a format in which the input file 106 is written. The first format may comprise a data exchange format. The data exchange format may be a human-readable data exchange format. For example, the input file 106 may be written in the data exchange format JSON. In other examples, the input file 106 may be written in a different data exchange format such as YAML, XML, or Protobufs.

The data input provided by the user 102 may relate to a component that may form part of a piece of software being compiled. The component may be a hardware component or a software component. For example, a hardware component may comprise a sensor, a controller, and/or an output device. As will be described below, a vehicle may comprise software that interfaces with a plurality of different sensors and causes operation of different output devices. A software component may comprise an API, a controller, an application, or an interface for another component.

In some examples, the user 102 may be provided with a template and/or a configuration file to assist with generation of the input file 106. The template may include portions for completion by the user providing data input. In such an example, the template may include a portion for specifying the component. The template may include one or more additional portions that indicate an operational parameter for the component that the user 102 is able to complete. A configuration file may indicate a schema or types of expected input, and may specify operational parameters that are required to be specified in the input file by the user as well as operational parameters that are optional. A configuration file may also identify permitted values or permitted ranges for operational parameters.

The user 102 may provide data relating to a component and to one or more operational parameters of the component in the input file 106. The one or more operational parameters may comprise, for example, an amount of memory for use by the component (i.e., a 'stack size'), a name of the component, timing signals used by the component, an interface or interface protocol used by the component to communicate with other components, other components with which the component may interface, a message protocol used by the component, a validation level indicating an extent to which a component has been validated, an owner of the component, etc. The one or more operational parameters may also comprise specifics about how messages are to be sent or arranged. The user 102 may specify a value for each of the operational parameters in the template 104.

The input file 106 may be referred to as a 'first file' to distinguish from subsequent files described below. The input file 106 may comprise data from a template or predetermined configuration file combined with the data input by the user 102 combined.

As shown in FIG. 1, a plurality of input files 106 may be generated. For example, there may be provided an input file 106 for each of a plurality of components. The user 102, or a plurality of users 102, may input data for each of the plurality of components to create the plurality of input files 106. A plurality of input files 106 may be generated for a plurality of components where each component is configured to interface with the other components, so that the values indicated for the operational parameters used to enable this interfacing are defined in a suitable and substantially uniform way. In some examples, a plurality of input files 106 may be generated by a user 102 for the purposes of testing a range or plurality of operational parameters that may be used for a particular component.

The input file 106 may be input to a code generating software tool 108. In some examples, after generating the input file 106, it may be stored with pieces of source code that have been generated manually as well as other input files 106. A build tool may be invoked to run a build process. As part of the build process, the build tool may call a code generating software tool 108, to which the input file 106 may be input. In other examples, the user 102 may provide the input file 106 to the code generating software tool 108.

The code generating software tool 108 may be configured to generate a source code file 110 based on the input file 106. The code generating software tool 108 may generate the source code file 110 by converting the input file 106 written in a data exchange format to a source code file 110 written in a human-readable programming language. For example, the code generating software tool 108 may be configured to convert an input file 106 written in JSON into a source code file 110 written in C++. In other examples, the code generating software tool 108 may convert input files 106 written in another data exchange format. The code generating software tool 108 may convert the input file 106 to a source code file 110 written in another human-readable programming language.

The code generating software tool 108 may be configured to generate the source code file 110 by generating source code based on the data found in the input file 106. For example, the source code file 110 may be generated dependent upon the values for the operational parameters or on the component specified by the user 102, and that is specified in the input file 106. For example, if the component is configured to interface with a first set of other components, such as a first set of sensors, and this is specified in the input file 106, then the code generating software tool 108 may be configured to generate source code that enables the component to interface with the first set of sensors. In another example, the input file 106 may specify a specific amount of memory to be allocated for use by the component, and the code generating software tool 108 may generate source code that allocates the memory for use by the component. The code generating software tool 108 may be written in a human-readable programming language. For example, the human-readable programming language may be Python, though this is not meant to be so limiting and any programming language may be used.

The code generating software tool 108 may make use of one or more source code templates that correspond to an operational parameter. The source code template corresponding to the operational parameter may have a portion that is to be populated with the value specified in the input file 106, in the programming language. The code generating software tool 108 may populate the source code template with the value, albeit in the programming language rather than the data exchange format of the input file 106. For each operational parameter and value, one or more source code templates may be determined and populated, and the source code templates together may be combined to form the source code file 110.

In other words, the user 102 specifies, in their data entry for the input file 106, a component and values for operational parameters. These may be considered to be operational requirements for the component. The input file 106 includes these values and they are provided to the code generating software tool 108 as part of the input file 106. Based on these values, the code generating software tool 108 generates code that fulfils the requirements specified by the input file 106. The code, which then forms part of the source code file 110, may include many lines of code dedicated to one of the values of the operational parameters. The code is therefore generated based on the values in the input file 106, rather than being a conversion.

As also depicted in FIG. 1, a plurality of source code files 110 may be generated by the code generating software tool 108. Each source code file 110 may concern a component of a plurality of components. Alternatively, a plurality of source code files 110 may be generated for each component by the code generating software tool 108. In some examples, there may be a one-to-one relationship between the input files 106 to the code generating software tool 108 and the source code files 110 output from the code generating software tool 108. In other examples, each input file 106 may result in a plurality of source code files 110 output from the code generating software tool 108.

The source code files 110 may be generated by the code generating software tool 108 to have a predetermined portion 112 and a dynamic portion 114. The predetermined portion 112 may be a fixed portion of code in the human-readable programming language. By fixed and/or predetermined it is meant that the code in this portion 112 is substantially the same for each source code file 110. The dynamic portion 114 comprises the code that is generated based on the input file 106. In other words, where a user 102 has entered a value that is variable, the code generating software tool 108 uses the value to generate code. The predetermined portion 112 and the dynamic portion 114 may be designated within the source code file 110. Designating the different parts of the source code file 110 may allow unit tests or other qualification tools to perform the appropriate actions on the correct portion of the source code file 110. Alternatively or additionally, the source code file 110 may have further indicators to specify particular parts of the source code file 110 on which the tests or tools are to act.

Separating the predetermined portion 112 and the dynamic portion 114 of the code enables the predetermined portion 112 to be qualified separately from the dynamic portion 114. Particularly, qualification on the dynamic portion 114 may require identifying errors introduced by the code generating software tool 108, the generation of the input file 106, and/or the data input by the user 102, which may be performed by a qualification tool as described below. This may be performed each time a source code file 110 is generated. Separating the predetermined portion 112 enables qualification of the predetermined portion 112 prior to using the code generating software tool 108, so that when the predetermined portion 112 is included in the source code file 110 during the process described in relation to FIG. 1, there is less qualification to do on the source code file 110 because part of it has already been qualified.

The source code file 110 generated by the code generating software tool 108 may be stored for subsequent use. The source code file 110 may be stored in a code base repository. Alternatively, the source code file 110 may be stored in a local cache. Particularly where a build process is run, the source code file 110 may be stored with other source code files generated by the code generating software tool 108 in a cache of a remote server that is accessible to a compiler.

The source code file 110 forms part of a code base 116 with one or more further source code files 118 that may be used to compile the software. The further source code files 118 may also have been generated using the code generating software tool 108. Alternatively, the further source code files 118 may have been generated by a different code generating software tool 108. Alternatively, the further source code files 118 may have been written by a programmer.

The further source code files 118 may be configured to interact with the source code file 110 and with each other to enable the software to operate. For instance, any one or more components may operate based on a publisher-subscriber model and object code compiled from the source code file 110 may subscribe to publications associated with the component specified in the input file 106 to perform various operations in accordance with the operational parameters specified. Additionally or alternatively, various Application Programmer Interfaces (APIs) associated with the component may be accessible by source code file 110. As will be described below, the interaction between source code files 110, 118 may be harnessed to enable qualification of the software when compiled.

When the code base 118 comprises all the source code files for generating software, the code base 118 and the files 110, 118 therein are provided to a compiler 120. The compiler 120 builds the software based on the code base 118 and the files 110, 118. Once the software is built by the compiler 120, it is provided to the device on which it will be run, which in this example is a vehicle 122. If the source code file 110 is stored in a local cache that is accessed by the compiler 120, it may be deleted after the software is compiled.

The system 100 also includes one or more software tool qualification tools 124. These will be referred to as 'qualification tools' hereafter. The qualification tools 124 act to qualify the code generating software tool 108. This is achieved by qualifying the data that is variable within the system 100, i.e. that which is input by the user 102, as it passes through to the code base 116. As depicted by FIG. 1, the data may be qualified as part of the input file 106, while it is being used to generate source code file 110 by the code generating software tool 108, as source code file 110, or while it is in the code base 116, prior to being provided to the compiler 120. Accordingly, one or more qualification tools 124 may operate on the data to identify errors or inconsistencies at any stage of the process after the input file 106 is generated and before the full operation of the software. Full operation of the software may be considered to be after an initialization phase of the software. By qualifying the variable parts of the data that passes through the system 100, the qualification tools 124 are able to determine errors before they are able to form part of the software as well as when they do form part of the software. Upon determination of one or more errors, the qualification tools 124 may cause one or more actions to be performed based on the determination. The actions may be performed by one or more processors implementing the code generating software tool 108 and/or the qualification tool 124. For example, the action may be to prevent further steps being taken. The action may also or alternatively be outputting an error message to the user 102 via a terminal which may include, for example, the source of the error (e.g., a particular component), a reason for the error, and the like. Alternatively, if no errors are found and/or a threshold level of code coverage is found, the code base may be validated for installation on a remote system (e.g., an autonomous vehicle).

Figure 2:
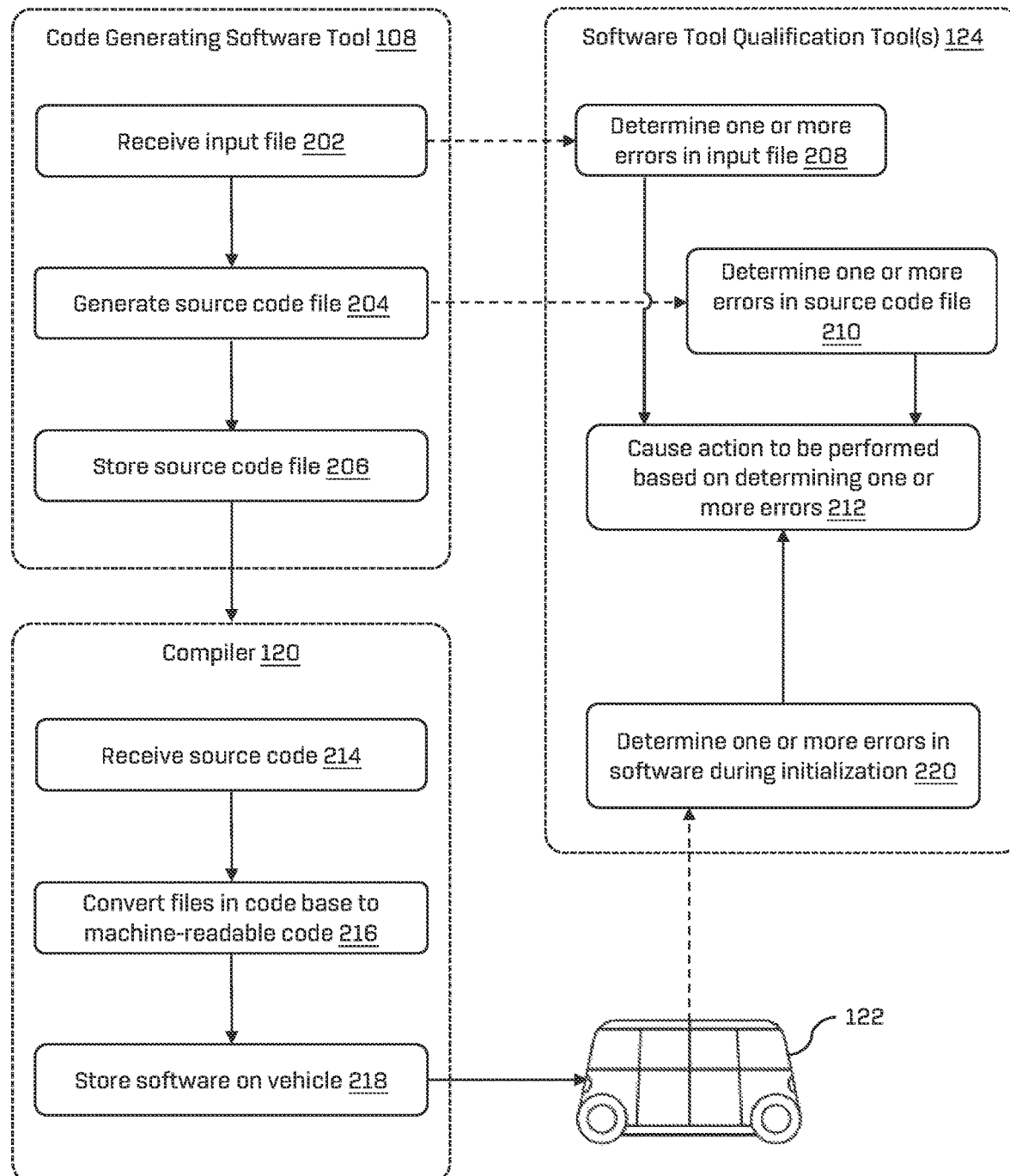
FIG. 2 depicts a process for software generation and qualification according to embodiments of the present invention.

In general, therefore, the process described in FIG. 1 may be expressed in terms of the actions of the code generating software tool 108, the compiler 120, and the software tool qualification tool 124, as shown in the process 200 in the diagram of FIG. 2. The process 200 of FIG. 2 may form part of a wider build process as described above, in which the operation of the code generating software tool 108, the compiler 120, and the software tool qualification tool 124 are called automatically, without manual interaction.

At a first step 202, the code generating software tool 108 may receive an input file, such as input file 106. The code generating software tool 108, a step 204, may generate a source code file, such as source code file 110. The code generating software tool 108 may store the source code file for subsequent access by the compiler 120, at step 206.

During the operation of the code generating software tool 108, one or more qualification tools 124 may be configured to determine one or more errors associated with the input file and/or source code file, based on determining errors in the input file, determining errors in the source code file, or determining errors in the software, as shown in steps 208, 210, and 220. Based on determining the one or more errors, the qualification tool 124 may cause an action to be performed.

After the source code file is generated at step 204 and determined to be error free at step 208, it may be made available to a compiler 120 by storing it at 206. The compiler 120, at step 214 receives or accesses a plurality of source code files of the code base including the source code file 110 stored by the code generating software tool 108 at step 206. The compiler 120 converts the source code files of the code base to machine-readable code at step 216 and stores the software on the vehicle 122 at step 218.

Figure 3:
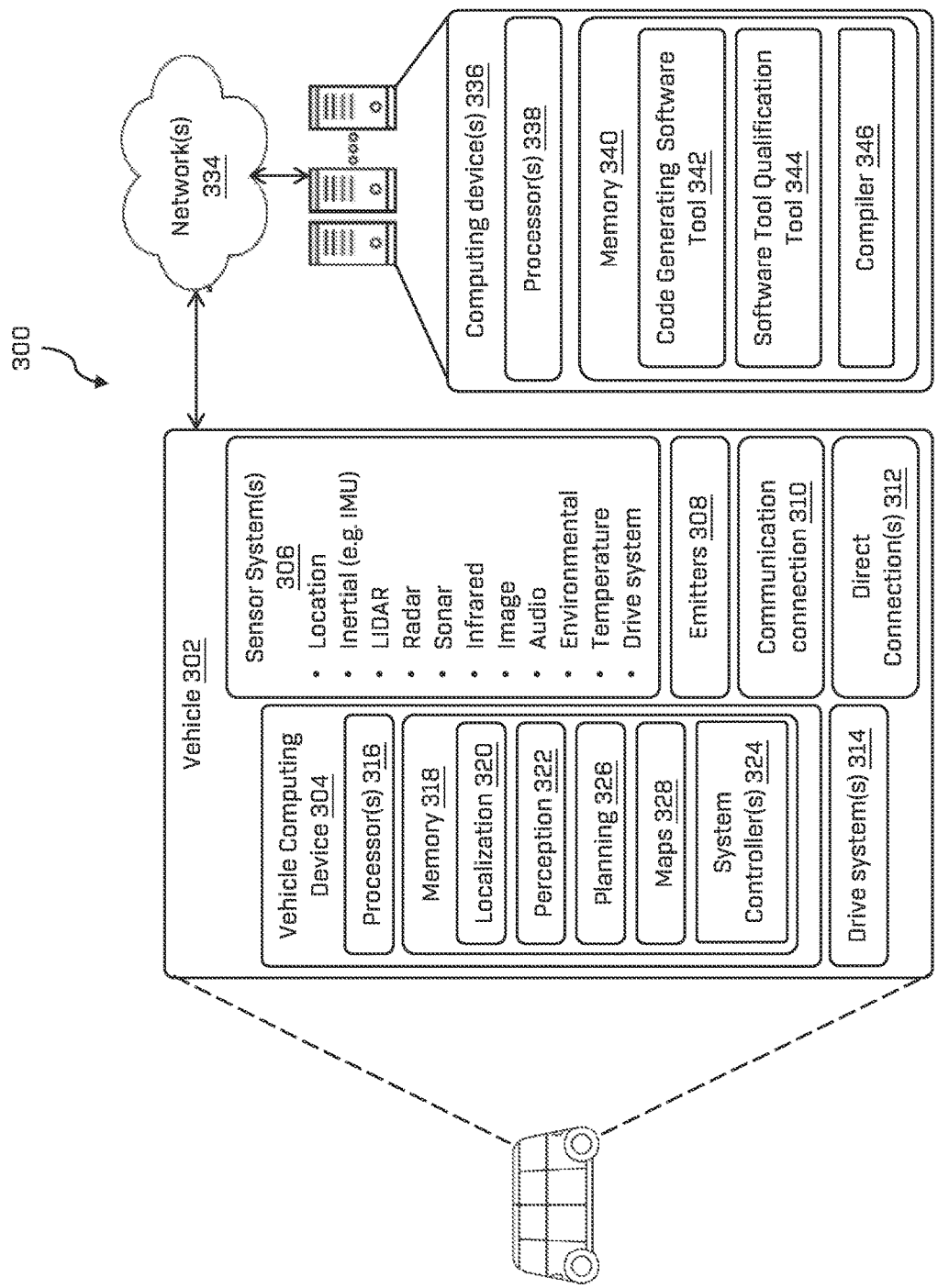
FIG. 3 depicts a block diagram of an example vehicle system.

Before the qualification tools and their operation are explained in detail, a brief example of how software may be provided to a device, such as the vehicle 122, and what software may be used on such a device is provided with reference to FIG. 3.

FIG. 3 shows an example vehicle system 300. The vehicle system 300 may include a vehicle 302, which may be the vehicle 122 of FIG. 1. The vehicle system 300 may also include a remote computing device 336. When the vehicle 302 is in operation it may communicate with the remote computing device 336. In the present example, the remote computing devices 336 may be configured to provide the software to the vehicle as described above. The remote computing device 336 may comprise one or more processors 338 and memory 340. The memory 340 may store a code generating software tool 342, such as the code generating software tool 108 of FIG. 1. Also stored in the memory 340 is a qualification tool 344, such as the qualification tool 124 of FIG. 1. The memory 340 may also store a compiler 346, such as the compiler 120. The memory 340 may also store a file used in the process of FIG. 1, including the input file 106 and source code file 110, although these are not shown in FIG. 3.

In some instances, the vehicle 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 302 may be a fully or partially autonomous vehicle having any other level or classification, or a non-autonomous vehicle. An autonomous vehicle may be a higher-level safety critical system than a partially autonomous vehicle or a non-autonomous vehicle.

The vehicle 302 may comprise a vehicle computing device 304. The vehicle computing device 304 may comprise one or more processors 316 and a memory 318 communicatively coupled with the processors 316. The memory 318 may store one or more pieces of software, such as localization software 320, perception software 322, planning software 326, and map software 328. The localization software 320 may be configured to receive data from the sensor system(s) 306 to determine a position and/or orientation of the vehicle 302 (e.g., one or more of an x-, y-, z-position, roll, pitch, or yaw). The perception software 322 may include functionality to perform object detection, segmentation, and/or classification. The planning software 326 may determine a location of a user based on image data of an environment received from the user using, for example, bags of binary words with image-based features, artificial neural network, and the like. The maps 328 may be used by the vehicle 302 to navigate within the environment. A system controller 324, which may be another piece of software, may also be stored at the memory 318. The system controller 324 may be configured to control steering, propulsion, braking, safety, emitters, communication, and other systems of the vehicle 302.

The vehicle 302 may further comprise a plurality of hardware components, such as drive systems 314, sensor systems 306, emitters 308, a communication connection 310, and a direct connection 312. The communication connection 310 may enable communication between the vehicle 302 and one or more other local or remote computing device(s), such as the computing device 336. Software components configured to control each of the hardware components may also be stored in the memory 318.

Though depicted in FIG. 3 as residing in memory 320 for illustrative purposes, it is contemplated that the localization software 320, perception software 322, planning software 326, and/or the one or more maps 328 may be accessible to the vehicle 302 (e.g., stored on, or otherwise accessible by, memory remote from the vehicle 302). For example, these pieces of software may be accessible to the vehicle at a remote computing device, such as device 336.

In some instances, aspects of some or all of the software discussed herein may include any models, algorithms, and/or machine learning algorithms. For example, the component(s) in the memory 320, 340 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

Each of the pieces of software described above may be built and qualified using the techniques described in FIG. 1 to ensure that errors that may cause the vehicle 302 to malfunction are not introduced by the software. The remote computing device 336 may be configured to generate and build one or more of the software of the vehicle 302 using the tools 342, 344 and compiler 346 stored in its memory 340. The remote computing device 336 may store the software in its own memory 340 for remote access by the vehicle 302, or may be configured to transfer the software via a network 234 to the vehicle. The network 234 may comprise a local connection, such as an internal network, or may comprise a global communication system such as the internet. The software may be provided to the vehicle 302 via the communication connection 310 from the network 234 and stored in the memory 318 of the vehicle 302 for implementation by the processors 316 of the vehicle 302. Alternatively, software may be transferred to the vehicle 302 via a direct connection between the computing device 336 and the direction connection 312 of the vehicle 302.

A particular example may be the perception software 322. The perception software 322 may include different software components that interact to enable the perception software 322 to receive inputs relating to the environment and to determine what is shown in the inputs before outputting the determinations to another piece of software, such as the planning software 326 to determine an appropriate course of action. The perception software may comprise software components based on source code that was manually written that relate to determining what is shown in the inputs and receiving the inputs. However, for example, it may also comprise software components generated from automatically generated source code from a code generating software tool, as described above, such as interface software components that allow the software to interface with the sensors from which the inputs relating to the environment may be received as well as the planning software and/or other controllers or software with which the perception software may interact to provide outputs. These interface software components require, at least, a messaging protocol to allow the interfacing to be performed. In some examples, the messaging protocol may include a publisher-subscriber model, and it may be specified, within the source code how this publisher-subscriber model is to operate for each of the interface software components. These features may be specified by user 102 in the input file 106, before they are used to generate source code by the code generating software tool 108. However, it is important to ensure that the publisher-subscriber model of one interface software component is compatible with the publisher-subscriber model of other interface software components and the other hardware and/or software components with which the interface software component is to operate. By compatible it is meant that the operation of the two software components will not introduce errors that cause a malfunction in the vehicle when the software is eventually run. Accordingly, the qualification tools described herein act to identify errors before the interface software components operate within the software when run on the vehicle.

Figure 4:
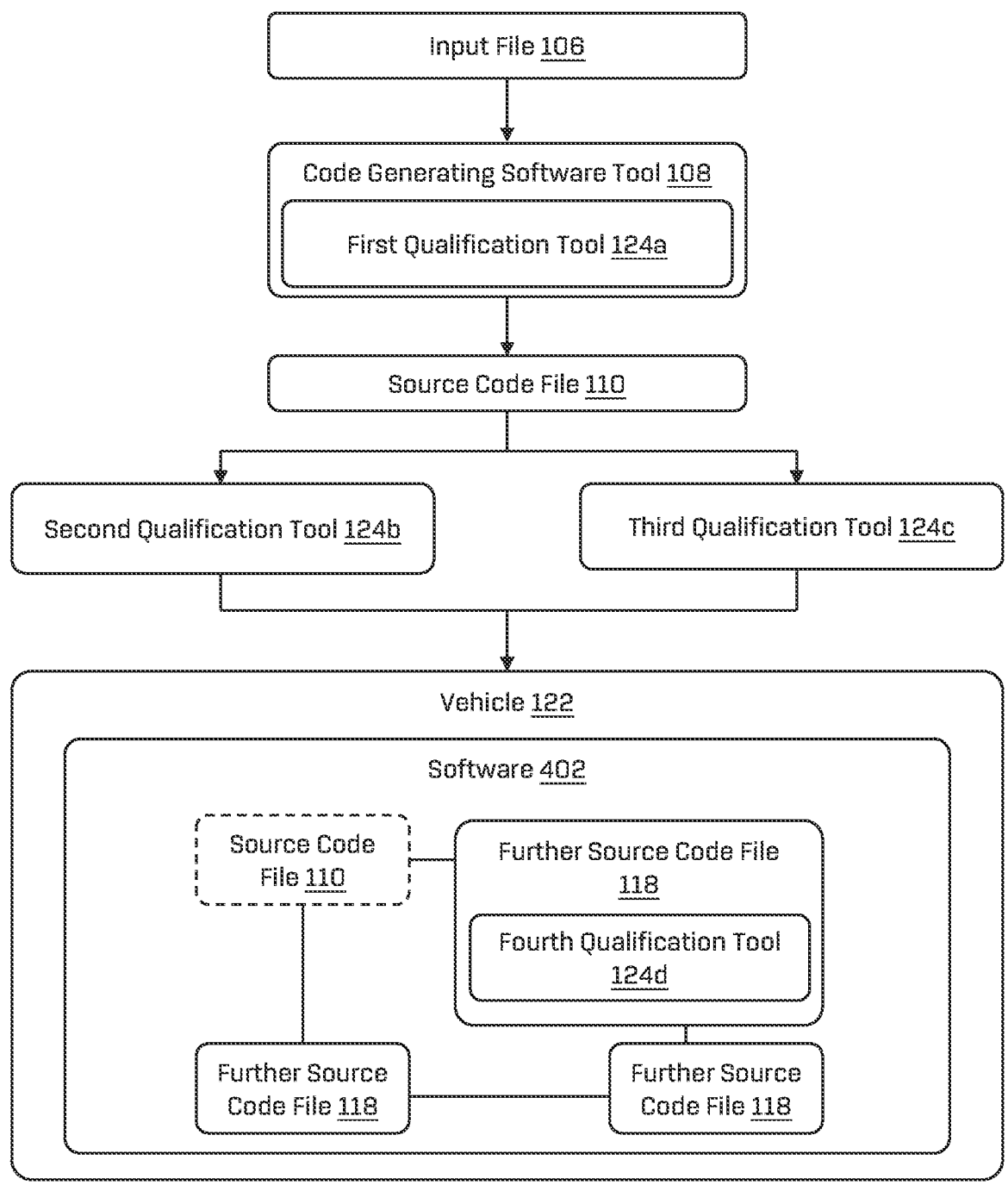
FIG. 4 is a block diagram depicting a system for software tool qualification according to embodiments of the present invention.
Figure 5:
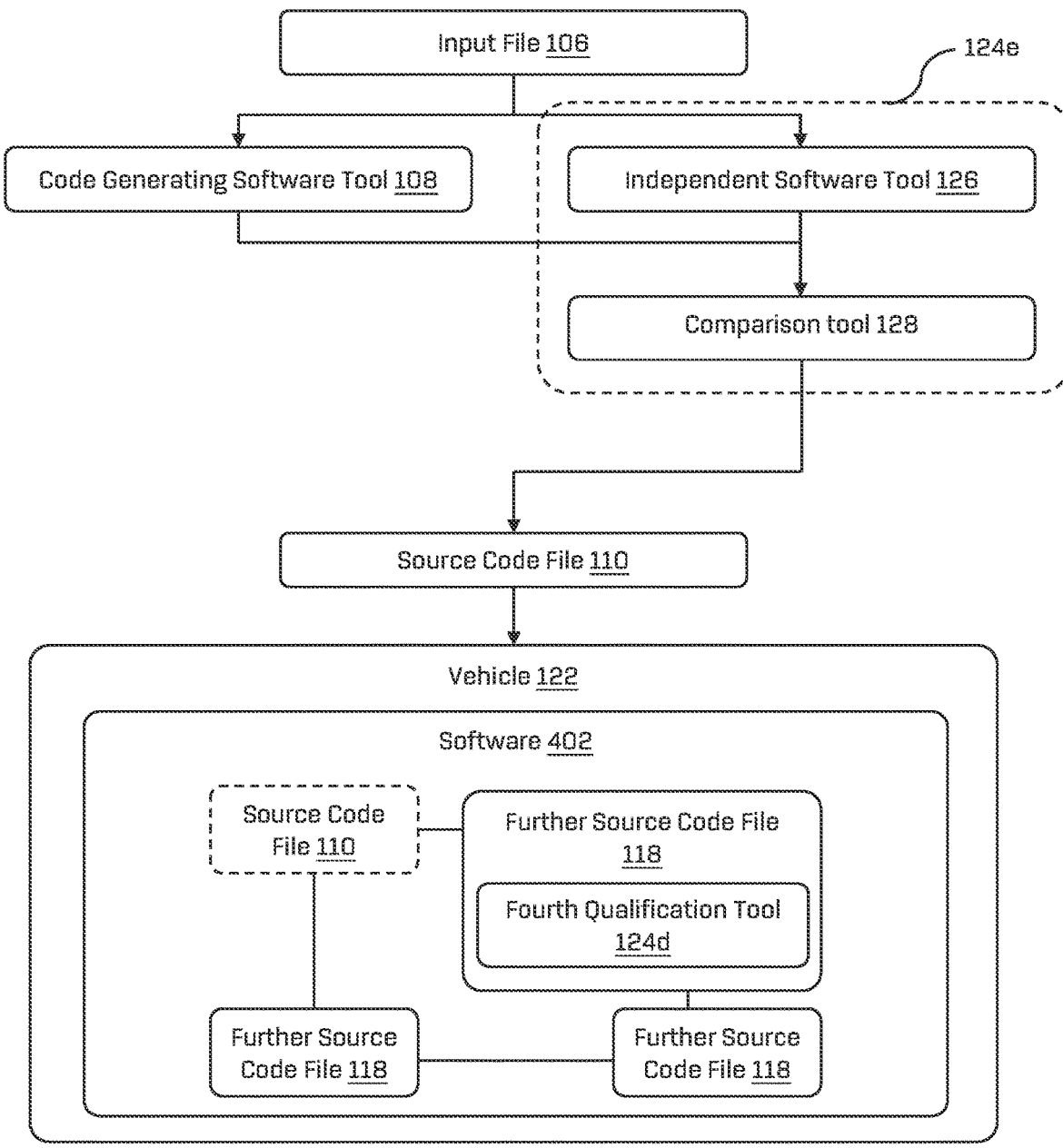
FIG. 5 is a block diagram depicting a system for software tool qualification according to embodiments of the present invention.

Turning now to FIG. 4 and FIG. 5, two example flow diagrams for software tool qualification are shown. Each of FIG. 4 and FIG. 5 depict the part of the system 100 of FIG. 1 that is subjected to qualification by the qualification tool 124, namely the part of the system 100 between the input file 106 and the code base 116, along with the qualification tool(s) that are applied to those parts. The diagrams of FIG. 4 and FIG. 5 provide example flows only, and it will be appreciated that each of the tools described in relation to these examples may be provided individually or in combination with any other qualification tool described herein.

In FIG. 4, the input file 106 is shown. The input file 106 may be passed to the code generating software tool 108, as in FIG. 1. In the embodiment of FIG. 4, the code generating software tool 108 may comprise a first qualification tool 124a. Therefore, during execution of the code generating software tool 108, the first qualification tool 124a may operate to qualify the input file 106. The first qualification tool 124a may be implemented before the code generating software tool 108 performs its main function of generating a source code file based on the input file.

In alternative embodiments, the first qualification tool 124a may be separate from the code generating software tool 108. The first qualification tool 124a may be configured to receive the input file 106 before it is provided the code generating software tool 108. The first qualification tool 124a may be configured to perform analysis of the input file 106 as described above and may determine whether one or more errors are present in the input file 106. The first qualification tool 124a may be configured to act as a barrier to the input file 106 being provided to the code generating software tool 108 if it is determined that one or more errors are present in the input file 106. The first qualification tool 124a may be configured to not provide the input file 106 to the code generating software tool 108 on determination of one or more errors. The first qualification tool 124a may be configured to provide the input file 106 to the code generating software tool 108 if the first qualification tool 124a determines that no errors have been identified in the input file 106 according to the criteria it applies.

Each of the qualification tools 124 described herein may be configured to output a message to be displayed to a user, such as user 102 via a terminal, based on the outcome of a determination by the qualification tool 124. The user to whom the message is output may also be a remote operator of a vehicle. For example, the first qualification tool 124a may determine one or more errors are present in the input file 106 and may output a message to the user indicating that one or more errors have been identified. The message may identify the errors that were identified. In the event that no errors were identified, the first qualification tool 124a may output a message indicating this. In some embodiments, the qualification tools 124 may be configured to log the error to memory for subsequent retrieval and analysis.

In some embodiments, a qualification tool 124 may allow the process to continue despite one or more errors being identified. In these embodiments, a message may be output indicating that one or more errors have been identified so that the user is aware of the finding of the qualification tool 124.

The first qualification tool 124a may be considered to apply a first qualification process to the input file 106. The first qualification tool 124a, as part of the first qualification process, may be configured to determine that values for the operational parameters contained within the input file 106 are allowable values. The value for an operational parameter may be compared by the first qualification tool 124a with a set of permitted or allowed values for the operational parameter. For example, an operational parameter may require a numerical input and the allowed values may comprise a range of values. The value in the input file may be compared with one or more limit values of the range of values. In other examples, an operational parameter may specify a text input, and the allowed values for the operational parameter may comprise a plurality of different text inputs.

The first qualification tool 124a may be configured to determine a type or class of input for the operational parameter. As described above, the operational parameter may take a numerical or a text input, and the first qualification tool 124a may be configured to determine that the value provided by the user and included in the input file 106 takes the correct form, i.e. is a number or is text, depending upon the requirements of the operational parameter.

The first qualification tool 124a may also be configured to apply one or more unit tests to the input file 106. In some examples, the first qualification tool 124a may be configured to determine whether one or more of the values for the operational parameters are suitable. This feature is described in more detail in relation to the third qualification tool below.

The first qualification tool 124a may be configured to determine one or more fields that are required by the code generating software tool. These fields may be specific to the component specified in the input file. The first qualification tool 124a may then determine, based on the input file, that the fields required by the code generating software tool are present in the input file. The first qualification tool 124a may determine that there are no errors present in the input file based on determining that the fields required by the code generating software tool are present in the input file.

The first qualification tool 124a may be configured to determine one or more fields that are not permitted to be used in conjunction with a piece of software being compiled and/or the component for which the code generating software tool is being used. If any of the one or more fields are found in the input file, then the first qualification may determine that there is an error in the input file and prevent it from being passed to the code generating software tool for generating source code.

The first qualification tool 124a may be configured to identify one or more optional fields for the component and/or that are permitted by the code generating software tool. The first qualification tool 124a may be configured to determine, based on the one or more optional fields, one or more further fields corresponding to the optional fields that are required by the code generating software tool. If these further fields are not present in the input file, then the first qualification tool 124a may determine that there is an error in the input file.

The first qualification tool 124a may be configured to identify one or more unknown fields in the input file that cannot be parsed or used by the code generating software tool, and to determine an error in the input file in dependence upon this identification.

In order to achieve the above qualification processes, the first qualification tool 124a may be configured to parse the input file 106 to identify the relevant data therein.

The first qualification tool 124a may therefore be configured to validate the data provided by the user 102 to form the input file 106. By checking the input file 106 before it is used to generate a source code file 110 by the code generating software tool 108 errors in the data may be identified early in the process, before they are converted to source code. If errors such as data being outside an allowable range or not within a specified class or type were allowed to progress through the software tool 108, these errors may be obscured by the software tool 108 or may cause additional problems. Identifying such errors introduced by the user as early as possible is important to ensure that errors do not propagate and multiply.

As described in relation to FIG. 1, the code generating software tool 108 may generate the source code file 110. As also described above, this may be dependent upon the first qualification tool 124a and the first qualification process it performs. The code generating software tool 108 may be prevented from generating the source code file 110 based on the first qualification tool 124a determining that one or more errors are present in the input file 106. The code generating software tool 108 may be permitted to generate the source code file 110 by the first qualification tool 124a if the first qualification tool 124a has not identified one or more errors in the input file 106. The source code file 110 may be subject to one or more further qualification tools, such as second qualification tool 124b and/or third qualification tool 124c, before it is stored in the code base 116. Storing the source code file 110 in the code base 116 may be considered to be part of the operation of the code generating software tool 108, or a wider software tool 108 that includes the code generating software tool 108. The second qualification tool 124b and the third qualification tool 124c may alternatively apply the qualification processes they perform concurrently with the source code file 110 being stored in the code base 116.

The second qualification tool 124b and/or the third qualification tool 124c may be applied to the dynamic portion 114 of the source code file 110. The second qualification tool 124b and/or the third qualification tool 124c may not be applied to the predetermined portion 112 of the source code file 110. Applying these tools to the dynamic portion 114 only may reduce the number of tests required and the amount of processing and time required to perform the processes implemented by the tools 124b, 124c.

The second qualification tool 124b may be configured to apply one or more unit tests to the source code file 110. In other words, the second qualification tool 124b performs a second qualification process based on the source code file 110. The second qualification tool 124b may base the second qualification process on the source code file 110 only. Accordingly, the second qualification tool 124b is configured to determine errors that are specific to the source code file 110 and that have been introduced by the code generating software tool 108 and/or that were present in the input file but were not identified as errors by the first qualification tool. Therefore, not only does the second qualification tool 124b perform a useful validation of the source code file 110, and therefore qualification of the code generating software tool 108, but it may also validate the first qualification tool 124a as well. The second qualification tool 124a may be considered to be a local tool—it performs tests on the source code file 110 at a file level and therefore identifies errors and inconsistencies that are internal to the source code file 110.

The unit tests may be configured to verify that the code in the source code file 110 is free from values that do not take an allowed value, as also performed by the first qualification tool 124a. The unit tests may be configured to verify that, where a class or data type for a particular operational parameter is specified within the code of the source code file 110, the value provided for the operational parameter is of the correct class or data type. For example, the unit tests may determine an expected data type associated with the operational parameter, and determine whether an actual data type for the value of the operational parameter that is found in the source code file 110 corresponds to the expected data type for the operational parameter. If there is not a correspondence, then an error may be identified. In other examples, the unit tests may be configured to identify one or more syntax errors introduced by the translation of the data exchange format of the input file 106 to the programming language of the source code file 110. Generally, it may be said that the second qualification tool 124*b* determines that the source code file 110 is free from internal inconsistencies and/or errors.

The third qualification tool 124*c* may be configured to apply one or more tests to the source code file 110 to identify inconsistencies between the data within the source code file 110, i.e. values or code that have been generated by the code generating software tool 108 based on the data input by the user, and data of other source code files 118. For example, the user may have specified a particular value for an operational parameter within the input file 106. The particular value may be permissible and may be in the correct format, meaning that the first and second qualification tools 124*a*, 124*b* may not have identified any errors. However, the value may be incompatible with other values chosen for corresponding components with which the software is intended to operate. For example, the user may choose a permissible message protocol for the component, but the message protocol may not be usable within the software that will be eventually built because one or more other components for which source code has already been generated may use a different message protocol that is inconsistent with and/or incompatible with the message protocol specified for the component. If the inconsistency were allowed without being rectified and the software were built with the inconsistency, then the system on which the software is run may malfunction when the two components attempt to exchange messages using different protocols.

Therefore, the third qualification tool 124*c* applies a third qualification process to the source code file 110. In the third qualification process, the data and code in the source code file 110 is checked against other source code files, such as source code files 118. This may be achieved using a list of values for operational parameters found in the other source code files, wherein the third qualification tool 124*c* is configured to compare the values of the source code file 110 with the values in the list to determine whether the values are the same and/or compatible.

In some examples, the third qualification tool 124*c* may validate data within the source code file 110 that is not directly taken from the input file 106 but that was generated by the code generating software tool 108 based on the input file 106. The third qualification tool 124*c* may therefore be configured to determine where portions of code within the dynamic part of the source code file 110 are incompatible with other portions of code of other source code files 118. For example, while two values specified by a user in the input file 106 may not be incompatible individually with other values of other components, the combination of these values may cause the software tool 108 to generate source code for inclusion in the source code file 110 that is incompatible with parts of other source code files 118. Again, these are inconsistencies that it is preferable to identify and remove prior to compilation of the source code files.

Storing the source code file 110 may be dependent on the second qualification tool 124*b* and/or the third qualification tool 124*c* determining one or more errors or inconsistencies in the source code file 110. If one or more errors or inconsistences are identified, the source code file 110 may be prevented from being stored. In other examples, the source code file 110 may be prevented from being used in the compilation if one or more errors or inconsistencies are identified. In other examples, identification of one or more errors or inconsistencies may lead to the compilation process, which is also referred to as the build process, being stopped. An error message may be sent to the user 102 via the terminal.

In alternative embodiments, the source code file 110 may be stored by the code generating software tool 108 as soon as it is generated, and the second qualification tool 124*b* and/or the third qualification tool 124*c* may be configured to perform their tests on the dynamic part 114 of the source code file 110 while it is stored. The second qualification tool 124*b* and/or the third qualification tool 124*c* may be applied to the source code file 110 prior to the compiler building the software.

The code base 116 as shown in FIG. 1 is not shown in FIG. 4. Instead, the vehicle 122 is shown in a schematic way, including software 402 that has been compiled based on the source code files 110, 118. For the purposes of depicting the software only, the source code files 110, 118 are depicted within the software. However, it will be appreciated that these files will have been compiled and converted to machine-readable code prior to the inclusion of the software on the vehicle 122.

When the software is compiled and loaded onto the vehicle, a fourth qualification tool 124*d* may perform a fourth qualification process. The fourth qualification tool 124*d* may, as shown in FIG. 4, be incorporated into one or more of the further source code files 118 that interact with at least the source code file 110 when the code is run. The fourth qualification tool 124*d* may also, or alternatively, act to qualify a particular operation of the software to ensure that the compilation was successful, and so that errors that were not identifiable prior to compilation may be identified prior to full operation, i.e. operation of the software on the vehicle, post-initialization. In this example, the fourth qualification tool 124*d* may comprise one or more runtime checkers or scripts that perform a fourth qualification process on the source code file 110. The one or more runtime checkers may be configured to run during initialization of the software 402. The one or more runtime checkers may determine that operations are implemented correctly by the software or that the values and classes used by the software are within an allowable range and/or are not impractical or inconsistent. If the runtime checkers identify one or more errors based on these determinations, the software 402 may be prevented from proceeding past the initialization phase. The fourth qualification tool 124*d* may also be configured to output a message to a user of the vehicle or a remote operator, such as a teleoperator of the vehicle, to indicate that one or more errors have been identified. Such runtime checkers may be incorporated in the vehicle during testing of the vehicle, and may be configured to run each time the vehicle initializes its software. In other examples, the runtime checkers may be removed prior to operation of the vehicle outside of a testing environment.

The combination of qualification tools at least three different points in the process of software generation using a code generating software tool provides a high level of assurance that the code generated by the software tool is free of errors and will not cause malfunction in the safety critical system on which the resulting software is to be run. The qualification tools operate to qualify the input file and the source code file to identify syntax errors, range errors, class errors, inconsistencies between parameters, and/or runtime errors. Incorporating a plurality of qualification tools provides a high level of assurance, while ensuring that errors are identified as early as possible. Furthermore, incorporating a plurality of qualification tools that run at different times ensures qualification of earlier tools.

Although not shown in FIG. 4, there may also be provided a further software tool qualification tool that is configured to perform qualification of the code generating software tool 108 directly. As described above in relation to FIG. 1, this further software tool qualification tool may comprise one or more unit tests configured to directly test the code generating software tool based on its input and expected outputs versus its actual outputs.

FIG. 5 illustrates another example of a software tool qualification tool 124e that may be provided. In this example, the qualification tool 124e comprises a software tool 126 that may be configured to perform the same process as the code generating software tool 108. In other words the software tool 126 generates the source code file 110 as well. However, the software tool 126 may be independent of the code generating software tool 108 and may have been generated independently from the code generating software tool 108. The software tool 126 may also be configured to generate the source code file 110 in a different way to the code generating software tool 108.

The qualification tool 124e may further comprise a comparison tool 128. The comparison tool 128 may be configured to receive the source code files generated by each of the code generating software tool 108 and the independent software tool 126. The comparison tool 128 may be configured to compare the two source code files to identify any differences between them. Differences between the two source code files that have been generated independently may indicate that there are errors in either the input file or the source code file output by the code generating software tool 108. Based on the comparison, the qualification tool 124e may be configured to cause an action to be performed, such as preventing the source code file 110 generated by the code generating software tool 108 from being provided to the code base 116.

EXAMPLE CLAUSES

A: a method comprising: receiving, from a user, input data comprising operational data associated with a component of a vehicle; generating, based at least in part on the input data, an input file written in a data exchange format; providing the input file as input to a code generating software tool; performing, by a first qualification tool, a first qualification process based on the input file, wherein the first qualification process is configured to parse the input file and to check the input file for errors; generating, based on the first qualification process determining that the input file is free of errors and by the code generating software tool, source code comprising instructions to interface with the component, the source code comprising a predetermined part and a dynamic part generated based at least in part on the input file; performing, by a second qualification tool, a second qualification process on the dynamic part of the source code, wherein the second qualification process is configured to check the dynamic part of the source code for errors introduced by the code generating software tool generating the source code; performing, by a third qualification tool, a third qualification process on the dynamic part of the source code, wherein the third qualification process is configured to check the dynamic part of the source code for inconsistencies between the input data received from the user and data from additional source code associated with the component; associating, based at least in part on the second qualification process determining that the dynamic part of the source code is free of errors and at least in part on the third qualification process determining that the input data and data from further source code is consistent, the source code with the additional source code; providing the source code and the additional source code in the code base to a compiler configured to build software from the files; transmitting the software to the vehicle; and performing, during initialization of the software, by a fourth qualification tool comprising a runtime script, a fourth qualification process on the software, wherein the fourth qualification process is configured to check that processes performed by the software that were specified by the source code are operating correctly.

B: a method as clause A describes, wherein the component comprises one of a software component or a hardware component of the vehicle, and wherein the operational data comprises one or more parameters that enable the operation of the component within the vehicle.

C: a method as clause A or clause B describe, wherein the first qualification process determines that a value in the operational data has an allowable value, and wherein generating the second file is based on the first qualification process determining that the operational data has an allowable value.

D: a method as any of clauses A to C describe, wherein the second qualification process determines, by one or more unit tests, that the dynamic part of the source code is free of internal inconsistencies or errors, and wherein associating the source code with the code base is based on the second qualification process determining that the dynamic part of the source code is free of internal inconsistencies or errors.

E: a system comprising: a memory; one or more processors; and one or more non-transitory computer-readable media storing instructions executable by the one or more processors, wherein the instructions, when executed, cause the one or more processors to implement: a first software tool, configured to: receive a first file in a first format, wherein the first file comprises data entered by a user that includes a value for an operational parameter of a component; generate, based at least in part on the data in the first file, a second file comprising source code in a second format that is different to the first format; and store the second file; and a second software tool, configured to: determine an error associated with one or more of the first file or the second file; and cause the processors to perform an action based on determining the error.

F: a system as clause E describes, wherein the first format comprises a data exchange format, wherein the second format comprises a programming language, and wherein the first software tool is configured to: determine the operational parameter of the component and the value for the operational parameter of the component based on the first file; determine a source code template corresponding to the operational parameter;

populate the source code template with the value for the operational parameter in the programming language; and generate the second file based on the source code template populated with the value for the operational parameter.

G: a system as clause E or clause F describe, wherein the component comprises a software component, and wherein the operational parameters comprise: an amount of memory for use by the component; a name of the component; a timing signal for the component; an interface or interface protocol for the component to communicate with another component; another component with which the component interfaces; a message protocol for the component; a validation level indicating an extent to which a component has been validated; or an owner of the component.

H: a system as any of clauses E to G describe, wherein the second software tool is configured to: compare the value in the first file with a predetermined range of values for the operational parameters; determine the error in the first file based on the value being outside the predetermined range of values; and cause the processors to prevent the second file from being generated based on determining the error.

I: a system as any of clauses E to H describe, wherein the second file comprises a first portion of code that is predetermined and a second portion of code that is based on the data entered by the user in the first file and wherein the second software tool is configured to determine the error in the second portion of the second file.

J: a system as any of clauses E to I describe, wherein the second software tool comprises a unit test and is configured to: determine an expected data type for the operational parameter; determine that the actual data type for the value of the operational parameter in the second file does not correspond to the expected data type; determine the error in the second file based determining that the actual data type does not correspond to the expected data type.

K: a system as any of clauses E to J describe, wherein the second software tool is configured to: compare a value for a parameter in the data in the second file that defines an interaction between components with a value for the operational parameter in the data of a further file comprising source code; and determine that an error is present in the second file based on the comparison indicating that the values do not match.

L: a system as any of clauses E to K describe, wherein the one or more non-transitory computer-readable media storing instructions cause the one or more processors to implement a compiler that is configured to: access a plurality of further files; access the second file; compile the second file and the plurality of further files as software comprising machine-readable code; and store the software for operation on the device, wherein the software comprises the second software tool and wherein the second software tool is configured to determine the error in the software during initialization of the software.

M: One or more non-transitory computer-readable media storing instructions executable by the one or more processors, wherein the instructions, when executed, cause the one or more processors to implement: a first software tool, configured to: receive a first file in a first format, wherein the first file comprises data entered by a user that includes a value for an operational parameter of a component; generate, based at least in part on the data in the first file, a second file comprising source code in a second format that is different to the first format; and store the second file; and a second software tool, configured to: determine an error associated with one or more of the first file or the second file; and cause the processors to perform an action based on determining the error.

N: one or more non-transitory computer-readable media as clause M describes, wherein the first format comprises a data exchange format, wherein the second format comprises a programming language, and wherein the first software tool is configured to: determine the operational parameter of the component and the value for the operational parameter of the component based on the first file; determine a source code template corresponding to the operational parameter; populate the source code template with the value for the operational parameter in the programming language; and generate the second file based on the source code template populated with the value for the operational parameter.

O: one or more non-transitory computer-readable media as clause M or clause N describes, wherein the second software tool is configured to: determine a required operational parameter for the second file; determine, based on the first file, that the data in the first file does not include a value for the required operational parameter; determine the error based on determining that the data in the first file does not include a value for the required operational parameter; and cause the processors to prevent the second file from being generated based on determining the error.

P: one or more non-transitory computer-readable media as any of clauses M to O describe, wherein the second software tool is configured to: compare the value in the first file with a predetermined range of values for the operational parameters; determine the error in the first file based on the value being outside the predetermined range of values; and cause the processors to prevent the second file from being generated based on determining the error.

Q: one or more non-transitory computer-readable media as any of clauses M to P describe, wherein the second file comprises a first portion of code that is predetermined and a second portion of code that is based on the data entered by the user in the first file and wherein the second software tool is configured to determine the error in the second portion of the second file.

R: one or more non-transitory computer-readable media as any of clauses M to Q describe, wherein the second software tool comprises a unit test and is configured to: determine an expected data type for the operational parameter; determine that the actual data type for the value of the operational parameter in the second file does not correspond to the expected data type; determine the error in the second file based determining that the actual data type does not correspond to the expected data type.

S: one or more non-transitory computer-readable media as any of clauses M to R describe, wherein the second software tool is configured to: compare a value for a parameter in the data in the second file that defines an interaction between components with a value for the operational parameter in the data of a further file comprising source code; and determine that an error is present in the second file based on the comparison indicating that the values do not match.

T: one or more non-transitory computer-readable media as any of clauses M to S describe, wherein the one or more non-transitory computer-readable media storing instructions cause the one or more processors to implement a compiler that is configured to: access a plurality of further files; access the second file; compile the second file and the plurality of further files as software comprising machine-readable code; and store the software for operation on the device, wherein the software comprises the second software tool and wherein the second software tool is configured to determine the error in the software during initialization of the software.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

The invention claimed is:

1. A method comprising:
receiving, from a user, input data comprising operational data associated with a component of a vehicle;
generating, based at least in part on the input data, an input file written in a data exchange format;
providing the input file as input to a code generating software tool;
performing, by a first qualification tool, a first qualification process based on the input file, wherein the first qualification process is configured to parse the input file and to check the input file for errors;
generating, based on the first qualification process determining that the input file is free of errors and by the code generating software tool, source code comprising instructions to interface with the component, the source code comprising a predetermined part and a dynamic part generated based at least in part on the input file;
performing, by a second qualification tool, a second qualification process on the dynamic part of the source code, wherein the second qualification process is configured to check the dynamic part of the source code for errors introduced by the code generating software tool generating the source code;
performing, by a third qualification tool, a third qualification process on the dynamic part of the source code, wherein the third qualification process is configured to check the dynamic part of the source code for inconsistencies between the input data received from the user and data from additional source code associated with the component;
associating, based at least in part on the second qualification process determining that the dynamic part of the source code is free of errors and at least in part on the third qualification process determining that the input data and data from further source code is consistent, the source code with the additional source code;
providing the source code and the additional source code in the code base to a compiler configured to build software from the files;
transmitting the software to the vehicle; and
performing, during initialization of the software, by a fourth qualification tool comprising a runtime script, a fourth qualification process on the software, wherein the fourth qualification process is configured to check that processes performed by the software that were specified by the source code are operating correctly.

2. The method of claim 1, wherein the component comprises one of a software component or a hardware component of the vehicle, and wherein the operational data comprises one or more parameters that enable the operation of the component within the vehicle.

3. The method of claim 1, wherein the first qualification process determines that a value in the operational data has an allowable value, and wherein generating the second file is based on the first qualification process determining that the operational data has an allowable value.

4. The method of claim 1, wherein the second qualification process determines, by one or more unit tests, that the dynamic part of the source code is free of internal inconsistencies or errors, and wherein associating the source code with the code base is based on the second qualification process determining that the dynamic part of the source code is free of internal inconsistencies or errors.

5. A system comprising:
a memory;
one or more processors; and
one or more non-transitory computer-readable media storing instructions executable by the one or more processors, wherein the instructions, when executed, cause the one or more processors to implement:
a generation tool, configured to:
receive a first file in a first format, wherein the first file comprises data entered by a user that includes a value for an operational parameter of a component of a vehicle;
generate, based at least in part on the data in the first file, a second file comprising source code in a second format that is different to the first format, the second file comprising a predetermined part and a dynamic part generated based at least in part on the first file; and
store the second file;
one or more qualification tools, configured to:
perform a first qualification process configured to check for errors in the first file;
perform a second qualification process configured to check for errors in the dynamic part of the second file;
determine an error in one or more of the first file or the second file; and
cause the processors to perform an action based on determining the error; and
a compiler, configured to:
access the second file;
compile at least the second file as software; and
store the software for transmission to the vehicle.

6. The system of claim 5, wherein the first format comprises a data exchange format, wherein the second format comprises a programming language, and wherein the generation tool is configured to:
determine the operational parameter of the component and the value for the operational parameter of the component based on the first file;
determine a source code template corresponding to the operational parameter;
populate the source code template with the value for the operational parameter in the programming language; and
generate the second file based on the source code template populated with the value for the operational parameter.

7. The system of claim 5, wherein the component comprises a software component, and wherein the operational parameters comprise:
- an amount of memory for use by the component;
- a name of the component;
- a timing signal for the component;
- an interface or interface protocol for the component to communicate with another component;
- another component with which the component interfaces;
- a message protocol for the component;
- a validation level indicating an extent to which a component has been validated; or
- an owner of the component.

8. The system of claim 5, wherein the one or more qualification tools are configured to:
- compare the value in the first file with a predetermined range of values for the operational parameters;
- determine the error in the first file based on the value being outside the predetermined range of values; and
- cause the processors to prevent the second file from being generated based on determining the error.

9. The system of claim 5, wherein the one or more qualification tools comprise a unit test and are configured to:
- determine an expected data type for the operational parameter;
- determine that the actual data type for the value of the operational parameter in the second file does not correspond to the expected data type;
- determine the error in the second file based determining that the actual data type does not correspond to the expected data type.

10. The system of claim 5, wherein the one or more qualification tools are configured to:
- compare a value for a parameter in the data in the second file that defines an interaction between components with a value for the operational parameter in the data of a further file comprising source code; and
- determine that an error is present in the second file based on the comparison indicating that the values do not match.

11. The system of claim 5, wherein the compiler configured to:
- access a plurality of further files;
- compile the second file and the plurality of further files as software comprising machine-readable code; and
- store the software for operation on the vehicle, wherein the software comprises the one or more qualification tools and wherein the one or more qualification tools are configured to determine the error in the software during initialization of the software.

12. One or more non-transitory computer-readable media storing instructions executable by the one or more processors, wherein the instructions, when executed, cause the one or more processors to implement:
- a generation tool, configured to:
  - receive a first file in a first format, wherein the first file comprises data entered by a user that includes a value for an operational parameter of a component of a vehicle;
  - generate, based at least in part on the data in the first file, a second file comprising source code in a second format that is different to the first format, the second file comprising a predetermined part and a dynamic part generated based at least in part on the first file; and store the second file;
- one or more qualification tools, configured to:
  - perform a first qualification process configured to check for errors in the first file;
  - perform a second qualification process configured to check for errors in the dynamic part of the second file;
  - determine an error in one or more of the first file or the second file; and
  - cause the processors to perform an action based on determining the error; and
- a compiler, configured to:
  - access the second file;
  - compile at least the second file as software; and
  - store the software for transmission to the vehicle.

13. The one or more non-transitory computer-readable media of claim 12, wherein the first format comprises a data exchange format, wherein the second format comprises a programming language, and wherein the generation tool is configured to:
- determine the operational parameter of the component and the value for the operational parameter of the component based on the first file;
- determine a source code template corresponding to the operational parameter;
- populate the source code template with the value for the operational parameter in the programming language; and
- generate the second file based on the source code template populated with the value for the operational parameter.

14. The one or more non-transitory computer-readable media of claim 12, wherein the one or more qualification tools are configured to:
- determine a required operational parameter for the second file;
- determine, based on the first file, that the data in the first file does not include a value for the required operational parameter;
- determine the error based on determining that the data in the first file does not include a value for the required operational parameter; and
- cause the processors to prevent the second file from being generated based on determining the error.

15. The one or more non-transitory computer-readable media of claim 12, wherein the one or more qualification tools are configured to:
- compare the value in the first file with a predetermined range of values for the operational parameters;
- determine the error in the first file based on the value being outside the predetermined range of values; and
- cause the processors to prevent the second file from being generated based on determining the error.

16. The one or more non-transitory computer-readable media of claim 12, wherein the one or more qualification tools comprise a unit test and are configured to:
- determine an expected data type for the operational parameter;
- determine that the actual data type for the value of the operational parameter in the second file does not correspond to the expected data type;
- determine the error in the second file based determining that the actual data type does not correspond to the expected data type.

17. The one or more non-transitory computer-readable media of claim 12, wherein the one or more qualification tools are configured to:
- compare a value for a parameter in the data in the second file that defines an interaction between components with a value for the operational parameter in the data of a further file comprising source code; and determine that an error is present in the second file based on the comparison indicating that the values do not match.

18. The one or more non-transitory computer-readable media of claim 12, wherein the compiler is configured to:

access a plurality of further files;

compile the second file and the plurality of further files as software comprising machine-readable code; and store the software for operation on the vehicle, wherein the software comprises the one or more qualification tools and wherein the one or more qualification tools are configured to determine the error in the software during initialization of the software.

* * * * *